United States Patent
Anderson

(10) Patent No.: US 9,696,162 B2
(45) Date of Patent: Jul. 4, 2017

(54) MISSION AND PATH PLANNING USING IMAGES OF CROP WIND DAMAGE

(71) Applicant: Deere & Company, Moline, IL (US)

(72) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/856,884

(22) Filed: Sep. 17, 2015

(65) Prior Publication Data

US 2017/0082442 A1    Mar. 23, 2017

(51) Int. Cl.
| | |
|---|---|
| *G06F 19/00* | (2011.01) |
| *G01C 21/20* | (2006.01) |
| *B60W 10/04* | (2006.01) |
| *B60W 10/20* | (2006.01) |
| *A01B 69/00* | (2006.01) |

(52) U.S. Cl.
CPC .............. *G01C 21/20* (2013.01); *A01B 69/00* (2013.01); *B60W 10/04* (2013.01); *B60W 10/20* (2013.01); *B60W 2300/158* (2013.01); *B60W 2420/42* (2013.01); *B60W 2420/52* (2013.01); *B60W 2710/20* (2013.01); *B60W 2720/10* (2013.01)

(58) Field of Classification Search
CPC . A01D 41/1271; A01D 41/1272; A01D 57/12
USPC ............. 701/36, 50; 172/4.5, 9; 342/357.31; 382/110; 56/10.2 R
See application file for complete search history.

(56) References Cited

U.S. PATENT DOCUMENTS

| | | | |
|---|---|---|---|
| 5,995,895 A | 11/1999 | Watt et al. | |
| 6,128,574 A | 10/2000 | Diekhans | |
| 7,725,233 B2 | 5/2010 | Hendrickson et al. | |
| 8,060,269 B2 | 11/2011 | Dix | |
| 9,113,590 B2 * | 8/2015 | Johnson | A01B 79/005 |
| 2002/0193928 A1 * | 12/2002 | Beck | A01B 79/005 701/50 |
| 2014/2159841 | 8/2014 | Bischoff | |
| 2014/0301607 A1 | 10/2014 | Anderson et al. | |

OTHER PUBLICATIONS

Canopy height measurement by photogrammetric analysis of aerial images: Application to buckwheat lodging evaluation. 2 Pages (Abstract Only cited here). Journal Computers and Electronics in Agriculture vol. 89, Nov. 2012 pp. 70-75.
Harvest Tips for Lodged Corn, http://www.extension.iastate.edu/cropnews/2011/0905hanna.htm Sep. 6, 2011 by Mark Hanna, Department of Agricultural and Biosystems Engineering.

(Continued)

*Primary Examiner* — Gertrude Arthur Jeanglaud
(74) *Attorney, Agent, or Firm* — Joseph R. Kelly; Kelly, Holt & Christenson PLLC

(57) ABSTRACT

A harvest route generator system generates a harvest route for a harvesting machine. The harvest route generator system has a route generator that receives lodged crop information, from a sensor system, indicative of a characteristic of a lodged crop in a field and generates a harvesting route through the field for the harvesting machine, based on the lodged crop information. The harvest route generator system also has a communication component that communicates the harvesting route through the field to the harvesting machine.

18 Claims, 10 Drawing Sheets

(56) References Cited

OTHER PUBLICATIONS

An Overview of the Research on Texture Based Plant Leaf Classification, Vishakha Metre, et al. Computer Engineering Department, Pune University, MITCOE http://arxiv.org/ftp/arxiv/papers/1306/1306.4345.pdf 12 pages, IJCSN International Journal of Computer Science and Network, vol. 2, Issue 3, 2013, ISSN (Online): 2277-5420.

Stalk Lodging in Corn. Guidelines for Preventive Management, Bob Nielsen et a;/https://www.extension.purdue.edu/extmedia/ay/ay-262.html Issued in furtherance of the acts of May 8 and Jun. 30, 1914. The Cooperative Extension Service of Purdue University is an affirmative action/equal opportunity institution.

Ogden R. Todd et al. Functional Regression in Crop Lodging Assessment with Digital Images. Journal of Agricultural, Biological, and Environmental Statistics vol. 7, No. 3 (Sep. 2002), pp. 389-402.

Charlotte Py et al al. Measurement of wind-induced motion of crop canopies from digital video images Agricultural and Forest Meteorology. vol. 130, Issues 3-4. Jun. 30, 2005, pp. 223-236.

Root Lodging from Summer Storms Wyffels Hybrids accessed May 13, 2015 1:50 P.M. http://www.wyffels.com/agronornic-solutions/weather-and-environment/root-lodging-from-summer-storms.

\* cited by examiner

MISSION AND PATH PLANNING USING IMAGES OF CROP WIND DAMAGE

FIELD OF THE DESCRIPTION

The present description relates to agricultural vehicles. More specifically, the present description relates to agricultural vehicles used in harvesting operations.

BACKGROUND

One problem faced by farmers who farm a variety of crops, for example corn, wheat, rice, barley, or other standing crops is that these crops may be downed or damaged as a result of a storm occurring during the growing season or the harvesting season. When the storm occurs during the growing season, such that damaged crop is harvestable, a farmer may have one or more deployable harvesters available. Also, farmers sometimes have to manage harvesting downed crops in advance of another incoming storm.

Annually, a considerable volume of crop experiences damage due to storms. For example, a relatively large percent of corn acres can be affected annually by lodging or green snap in various geographical regions.

The discussion above is merely provided for general background information and is not intended to be used as an aid in determining the scope of the claimed subject matter.

SUMMARY

A harvest route generator system generates a harvest route for a harvesting machine. The harvest route generator system has a route generator that receives lodged crop information, from a sensor system, indicative of a characteristic of a lodged crop in a field and generates a harvesting route through the field for the harvesting machine, based on the lodged crop information. The harvest route generator system also has a communication component that communicates the harvesting route through the field to the harvesting machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Crops can be damaged by weather events. If the crop is fatally damaged while green, a farmer may decide to harvest the crop as soon as possible while leaving viable crop unharvested. Non-fatally damaged crop may experience some degree of recovery between time of damage and time of harvest. As an example, lodging is damage to a plant such that the plant bends or breaks at a point along the stalk, or such that the plant is uprooted completely from the ground.

Lodging may be recognizable based on received sensor signals. From an aerial perspective, for example, lodged crops can be detected in an aerial photograph as crops that are lying horizontally or substantially horizontally instead of standing vertically. However, other example sensing techniques can also be used, such as Lidar or satellite imagery.

Several problems face farmers of wind-downed crops. Such problems can include determining an efficient way to maneuver one or more harvesting vehicles through a field, minimizing costs associated with a problematic harvest, while maximizing profit, and potentially completing the harvest operation before a second storm arrives. As described herein, one potential solution is for a harvester, or other field device, to automatically calculate a harvest route based on sensor signals received that indicate where crops are lodged and what directions they are lying in.

Figure 1:
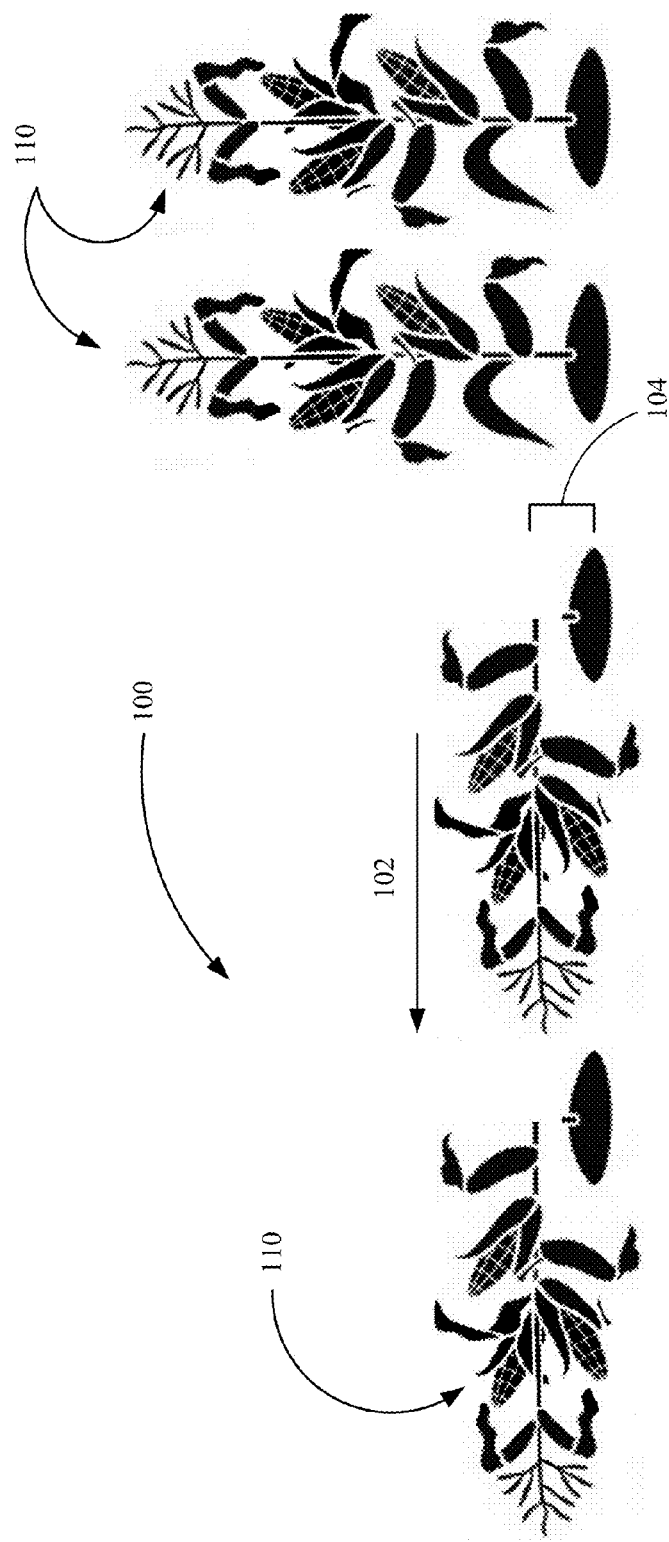
FIG. 1 illustrates an example field that has experienced some crop lodging.

FIG. 1 illustrates an example field that has experienced some crop lodging. The crop lodging may have occurred, for example, as a result of a recent wind storm. Additionally, while examples and methods described herein refer to harvesting lodged crops, one skilled in the art will understand that the examples and methods are also applicable for other harvesting operations. Some of the stalks of crop 110 in the crop field 100 have experienced lodging along a direction 102. However, different stalks of crop 110 may have different lodging directions 102. Lodged crops may also have a defined break height 104, for stalks that have snapped at some point along their length. However, at least some crop may be completely uprooted, or may be bent, but unbroken. Knowing the lodging direction 102 may allow for improved harvesting. For example, directing the harvester to approach wind-downed crops in a direction substantially opposite to direction 102 may improve harvested yield.

However, it is important to note that in the crop field 100 of FIG. 1, not all of the crop 110 has experienced lodging. It may be important to allow any undamaged crop, or crop that may recover, to remain in the field to completely mature prior to harvesting. In other examples, the entire field is harvested, but harvesting is more efficient if the harvester engages the crop in a direction opposite lodging direction 102. Therefore, a harvest plan that is used in maneuvering a harvesting machine through field 100 may indicate a direction of travel for a harvester as it moves through field 100, harvesting lodged crop.

Figure 2:
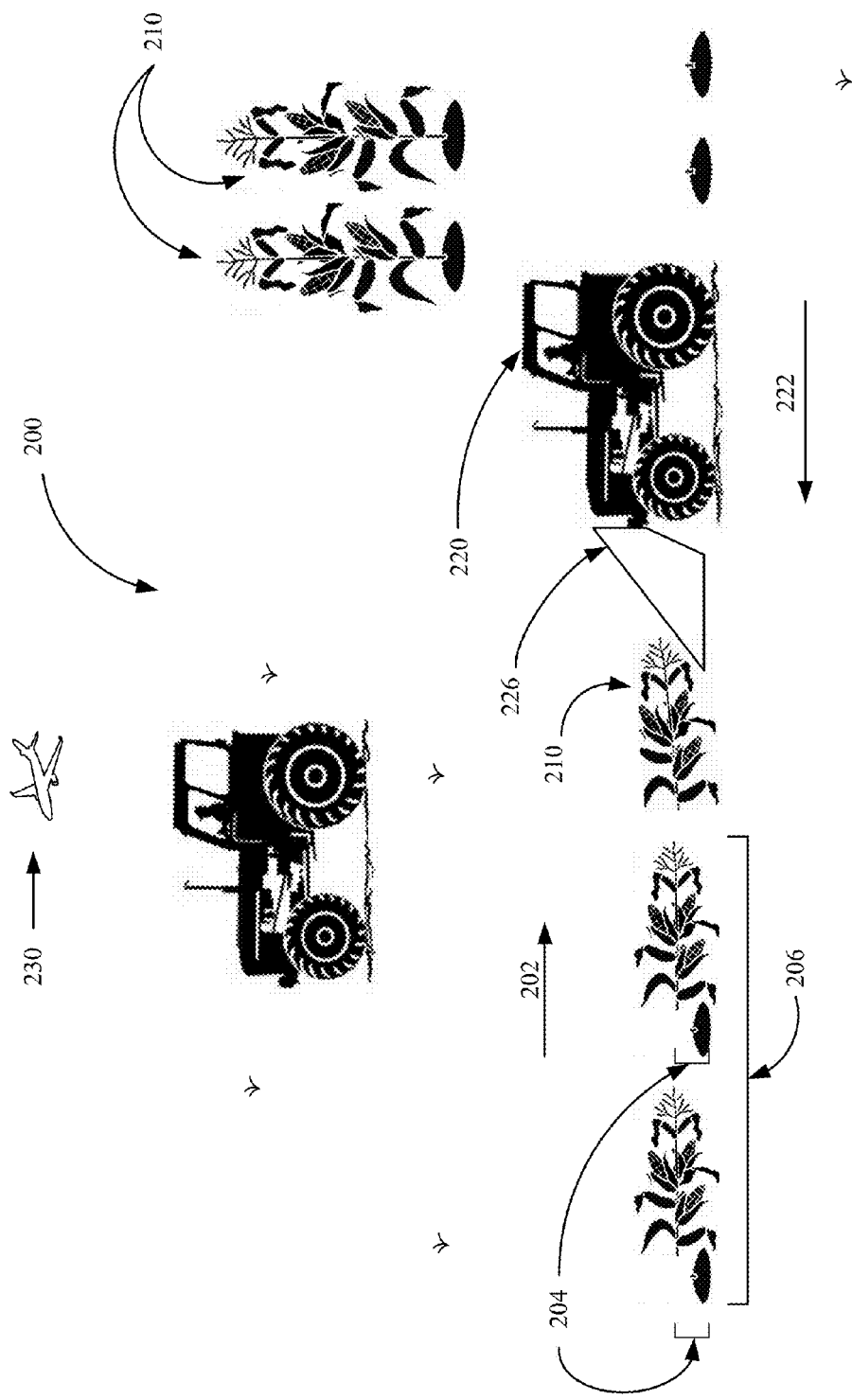
FIG. 2 illustrates example harvesting vehicles in a field, harvesting lodged crop.

FIG. 2 illustrates another example field 200 with some lodged crop 210 that lies in a lodging direction 202. As shown in FIG. 2, a harvester 220 is approaching a section of lodged crop 210 in a direction substantially opposite the lodging direction 202. A harvesting implement 226, which may be a header or other appropriate harvesting implement, may be set up such that it is at or below the break height 204 of the lodged crop 210. Some lodged crop may have different break heights 204, as different wind or other shearing forces may be present in a damage-causing event across a field 200. In one example, the harvester 220, or the implement 226, may have some device sensors configured to provide sensor signals regarding break height 204, and a controller can be configured to readjust the height of the implement 226 accordingly. Additionally, as crop 210 is harvested, implement 226 or harvester 220 may have some sensors configured to detect lodging direction 202. Harvester direction 222 may, then, be intermittently adjusted such that it remains substantially opposite to the lodging direction 202.

A magnitude associated with the lodged crop may also be sensed in FIG. 2. The magnitude may indicate an area of field 200 with lodged crop and also a severity of lodging experienced. In one example, the magnitude (e.g. a detected severity of crop lodging) may be important factors generating a harvesting plan for field 200.

FIG. 2 also illustrates a plurality of harvesters 220 in the example field 200. However, the methods and configurations described herein may be practiced with only one harvester, or with more than two harvesters.

In addition, FIG. 2 shows an example aerial capture device 230. The aerial capture device 230 may be configured to obtain information before or during a harvest operation. In one example, the aerial capture device 230 is an unmanned aerial vehicle (UAV). The UAV 230 may be sent out prior to harvesting in order to capture aerial image information regarding the crop field 200. The UAV may be configured to capture images, video, or other sensory information regarding field 200. Additionally, UAV 230 may be configured to make additional surveys of field 200 during a harvesting operation. However, while a UAV is illustrated as one type of device that carries a sensor, other devices or sensors may also be configured to capture information regarding crop lodging, for example Lidar sensors, manned aircraft, balloons, satellite imagery, etc.

Figure 3:
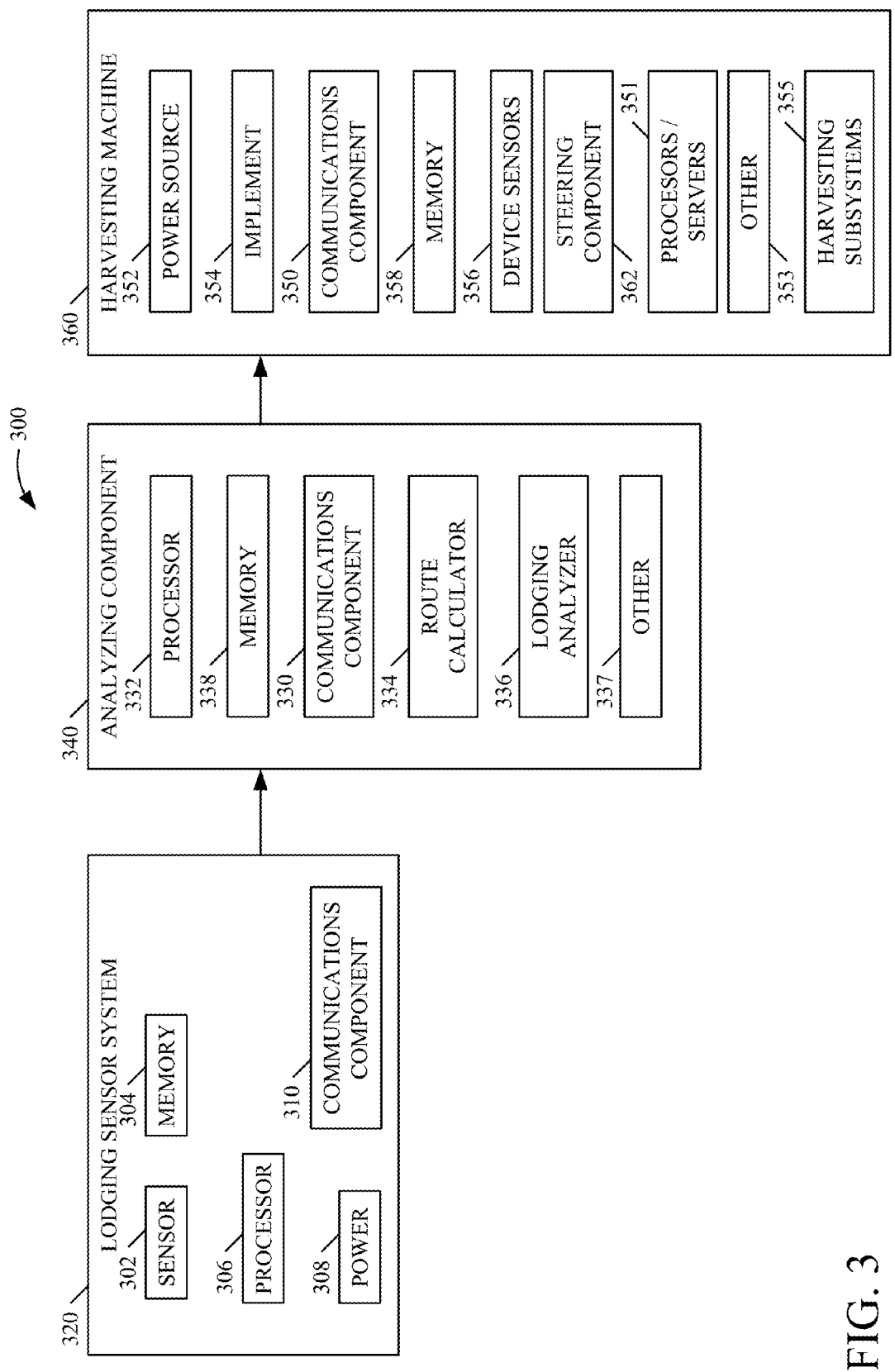
FIG. 3 illustrates a simplified block diagram of an example harvesting system.

FIG. 3 illustrates a simplified block diagram of an example harvesting system architecture 300. The architecture 300 may comprise one or more lodging sensor systems 320, analyzing components 340, and harvesting machines 360. Additionally, while shown as three separate components, lodging sensor systems 320, analyzing components 340 and harvesting machines 360 may be combined or subdivided in a variety of ways. For example, lodging sensor system 320 and analyzing component 340 may be components within UAV 230. This configuration may allow UAV 230, for example, to gather and analyze information obtained by lodging sensor system 320 such that harvesting directions are sent to harvesting machine 360. In another example, analyzing component 340 is part of the harvesting machine 360. This configuration may allow for analyzing component 340 to process raw sensor signals received from lodging sensor system 320 such that the analysis takes place within the harvesting machine 360. In another example, at least one lodging sensor system 320 is located proximate the harvesting machine 360 (for example a break height sensor 104 on a harvesting implement 226) and others are located elsewhere.

However, in a scenario where multiple harvesting machines 360 operate in unison to harvest a field, analyzing component 340 may also be a unit separate from either lodging sensor system 320 or harvesting machine 360. For example, analyzing component 340 may be a part of a mobile computing device used by one or more operators of harvesting machines 360. In another example, the analyzing component 340 may be a mobile computing device operated by an individual who is directing, but not directly operating, any of the harvesting machines 360.

Each of lodging sensor system 320, analyzing component 340 and harvesting machine 360 will now be discussed in further detail. Lodging sensor system 320 will be discussed first.

In one example, lodging sensor system 320 includes one or more individual sensors 302 or sensor arrays configured to receive lodging information about a field. For instance, sensor 302 may be a camera, stero camera, Lidar, or other imaging component, affixed on a part of lodging sensor system 320. Lodging sensor system 320 may also have a power source 308. In the example where lodging sensor system 320 is deployed on a UAV, power source 304 may be either a battery power source or a fuel power source. The UAV may also be tethered to another machine and receive power through the tether. Lodging sensor system 320 may have a processing component 306, configured to process commands received from a communications component 310. Processing component 306 may also be configured to direct, and process, signals received from, sensor 302. In one example, lodging sensor system 320 also has a memory component 304 configured to store received sensor information from sensors 302. Memory component 304 may also store commands received from communication component 310.

In an example, in which lodging sensor system 320 is deployed on a UAV, it may have sensors 302 mounted on or proximate the UAV. Processor 306 may, based on information from sensors 302, generate a field lodging map, for example a vector-based map showing lodging magnitude and orientation data for each element detected in a raster view of the field lodging map. The magnitude may range, for example from 0° for a crop still standing straight, to 90° for a crop which has been completely flattened. Orientation may correspond to a compass direction that the crop lies, and may comprise anywhere between 0° and 360°. There may be additional data received from sensors 302, for example, low stalk bend utilized to distinguish between a sharp green snap, root displacement in wet soil, or a bend in the stalk with minimal displacement to roots. This information may be helpful in determining whether or not some harvest areas should be marked in the field lodging map as "do not harvest" because a green crop may recover on its own rather than die prematurely. The generated lodging map may be communicated, through communication component 310, to analyzing component 340, harvesting machine 360, or to an operator thereof. If the crop is mature, a "do not harvest" designation may be assigned to severely lodged crop due to the time, cost, or other resource needed to harvest the crop relative to risks and opportunities of harvesting other areas first.

In one example, where lodging sensor system 320 is deployed on a UAV and sensor 302 is a camera, aerial image data received from lodging sensor system 320 may be analyzed for texture or other indication of crop lying in a given direction. Magnitude may be inferred from lengths of image segments corresponding to plants when viewed from above. The longer the image segment, the greater the lodging.

In another example, where lodging sensor system 320 is deployed on a terrestrial sensor vehicle, 3D images received from, for example, a stereo camera 302, or a Lidar system 302, may be similarly analyzed to provide orientation information for lodged crops. These terrestrial-based sensors 302 may be used on higher areas parallel to field 200, and the measured magnitudes may be based on the measured top of a plant canopy with respect to the ground. A recently obtained data set for unlodged crop, for example taken prior to a storm, regarding the unlodged crop height of canopy top to the ground may also be used, as a reference in order to determine magnitude of lodging in a field.

In one example, lodging sensor system 320 may be on a vehicle that is remotely controlled, or it may follow a preprogrammed path. The control system that controls the vehicle moving systems 320 may be part of analyzing component 340, harvesting machine 360, or another computing device. For example, it may be a remote controller or a mobile device such as a smartphone, tablet or laptop computer. Lodging sensor system 320 may be remotely controlled such that sensor information is sent by communication component 310 to analyzing component 340 and/or the harvesting machine 360 and/or another remote storage unit.

Examples of the analyzing component 340 will now be discussed in further detail. In one example, analyzing component 340 comprises a processing unit 332, a route calculator 334, a lodging analyzer 336, a memory component 338, and a communications component 330. It can include other items 337 as well. Analyzing component 340, through communications component 330, may communicate with lodging sensor system 320 and/or harvesting machine 360. Processor 332 can be configured to process information from lodging sensor system 320 and commands from harvesting machine 360, and direct received sensor signals and received commands to a lodging analyzer 336 and/or route calculator 334. Analyzing component 340 may also contain a power source (not shown). However, analyzing component 340 may be powered by power source 308 of the lodging sensor system 320 or power source 352 of harvesting machine 360.

Lodging analyzer 336 may be configured to analyze the signals received from sensors 302 and detect characteristics about crop 210 in a field 200. Lodging analyzer 336 may calculate lodging direction for lodged crop and may, for example, generate a vector map expressing lodging direction and break height of the lodged crop.

Route calculator 334 may be configured to receive the lodging analysis from lodging analyzer 336 and calculate a harvest plan. The harvest plan may comprise a map of sections of field 200, some of which may be classified as harvestable, along with an order of sections to harvest and a harvesting direction 222 for each section. The harvest plan may also comprise directions for one or more harvesting machines 360. The route calculator 334 may consider a variety of inputs in ordering field sections for harvesting, for example, cost per acre to harvest and/or time required to harvest. Route calculator 334 may also calculate a route based on signals from sensors 302.

Examples of harvesting machine 360 will now be discussed in further detail. Harvesting machine 360 may be any machine that is configured to harvest a crop. This can include, for example a combine harvester, a forage harvester, a sugarcane harvester, or any other appropriate harvesting vehicle.

Harvesting machine 360 may include a power source 352, a steering component 362, a harvesting implement 354, as well as an on-board computing device (such as processors or servers 351) with memory 358 and communications component 350. It can include device sensors 356 and other items 353 as well. Harvest implement 354 may be a header on a harvester, row units, or another appropriate implement. Device sensors 356 can be located within and/or proximate to harvesting machine 360. Device sensors 356 may, for example, provide information to an operator concerning remaining fuel, height of implement 354, and/or lodging information of harvested crop, etc.

Power source 352 may comprise a fuel-powered engine utilizing, for example hydrocarbon-based, or other fuel source. Power source 352 can also be a battery or other appropriate power source.

Communications component 350 can be configured to communicate with either or both of analyzing component 340 and lodging sensor system 320, through corresponding communication components 330 and 310, respectively. Communications component 350 may also be configured to allow for communication between harvesting machines 360, or between operators of multiple harvesting machines 360. Any or all of communications components 310, 330, and 350 may be configured for wireless communication, for example, comprising Internet-based communications, cellular-based communications, radio-based communication signals, near-field communications, or any other appropriate communication signal.

Memory 358 can be configured to receive and store directions for a current harvesting route. Servers and processors 351 may implement a control system that is configured to control propulsion and steering components 362, as well as the components of machine 360. Sensors 356 may also comprise a position sensor, such as a GPS (Global Positioning System) unit configured to sense a current position of machine 360.

Harvesting machine 360 may also include steering components 362. Steering component 362 may, in one example, be configured for operator-directed control of harvesting machine 360. However, harvesting machine 360 may also be configured for partially automated or fully automated control. The automated control may be performed, for example, by receiving the harvesting route from the route calculator 334 and then having automatically steering component 362 maneuver machine 360 along the indicated route, using position information from a position sensor (e.g. a GPS receiver). Automated control may also be implemented using other items as well.

Harvesting machine 360 may also include other harvesting subsystems 355. Harvesting subsystems 355 may comprise, for example, any or all of a threshing system, a separating system, a cleaning system, a residue system, a propulsion system, front end equipment systems, a header system, and/or material handling systems. The threshing subsystem may include a concave and a rotor. The separating subsystem may include a rotor. The cleaning subsystem may include a fan, a sieve and a chaffer. The residue subsystem may include a chopper and a spreader. The propulsion subsystem may include wheels and/or tracks. The front end equipment subsystem may include a header with chopping row units. The material handling subsystem may include a feederhouse, a feed accelerator, a discharge beater, a tailings elevator, a clean grain elevator and an unloading auger. However, other suitable subsystem constructions could also be used. Additionally, harvesting machine 360 may include other systems 353 as well.

Device sensors 356 may be located on, or proximate to, harvesting machine 360. For example, one device sensor 356 may be located on harvesting implement 354 and configured to monitor an implement height relative to a detected height of lodged crop being harvested. As mentioned above, device sensors 356 can include an internal GPS unit, or other location monitoring sensor, configured to monitor a position of harvesting machine 360.

Memory 358 may also store information received from any of device sensors 356. For example, device sensors 356 may intermittently provide sensor signals to harvesting machine 360. Harvesting machine 360 may then update a harvest route automatically. However, if multiple harvesting machines 360 are operating in concert, updated signals from sensors 356 may first be routed through a common analyzing component 340, such that all harvesting routes are updated in unison in response to signals from device sensors 356. Alternatively, a single analyzing component 340 can be located on a machine 360 and used to control the machines in concert. Or, each machine 360 may have an analyzing component 340, which communicate with one another. Machines 360 can also operate independently of one another.

Lodging sensor system 320 will now be discussed in further detail. While not shown in FIG. 3, lodging information received from lodging sensor system 320 may be presented to an operator of the harvesting machine 360, or to an operator of analyzing component 340. The lodging information may be presented as imagery or video feed received from sensors 302, a vector map measuring directionality 202 and break height 204 of lodged crop, for example, or in other ways.

Lodging sensor system 320 may be configured to obtain data about magnitude and direction of lodging in a field. Lodging data may be collected by a terrestrial sensor 302, for example located at or above ground level. Lodging sensor system 320 may also utilize a two-dimensional or three-dimensional camera sensor, a stereo camera, or Lidar to provide geo-referenced data. Geo-referencing may be done in real time through a geo-position sensor. However, lodging sensor system 320 may also, or alternatively, collect information through an aerial platform, such as through a UAV or satellite-based sensor 302. Use of a UAV may provide high resolution lodging data. Data may be collected from a variety of sensors 302, at any suitable time, for example seconds, minutes, hours, or days prior to a field being harvested.

Lodging sensor system 320 may operate in concert with device sensors 356 to generate, and update, an understanding of harvest-time conditions. Device sensors 356 may provide additional field or crop condition data that may allow for better control of harvesting machines 360. For example, it may be important to update lodging data during harvesting, as some crop may have sprung back, or experienced further lodging, since the lodging sensor system 320 originally collected data. Additionally, device sensors 356 may be useful in updating the height of harvest implement 354. Additionally, device sensors 356 may also be configured to measure how harvesting implement 354 is engaging a crop. Other device sensors 356 may comprise a mass sensor, grain yield sensor, grain loss sensor, or any other suitable sensor to determine actual harvesting yields. This information may be important as route calculator 334 may, in one example, calculate a route based on an expected harvesting yield. If a sensed yield is significantly greater than, or significantly less than, that predicted by the route calculator 334, it may be important to reengage an aerial lodging sensor system 320 in order to obtain more accurate and up-to-date information, or otherwise update a harvest plan.

Figure 4:
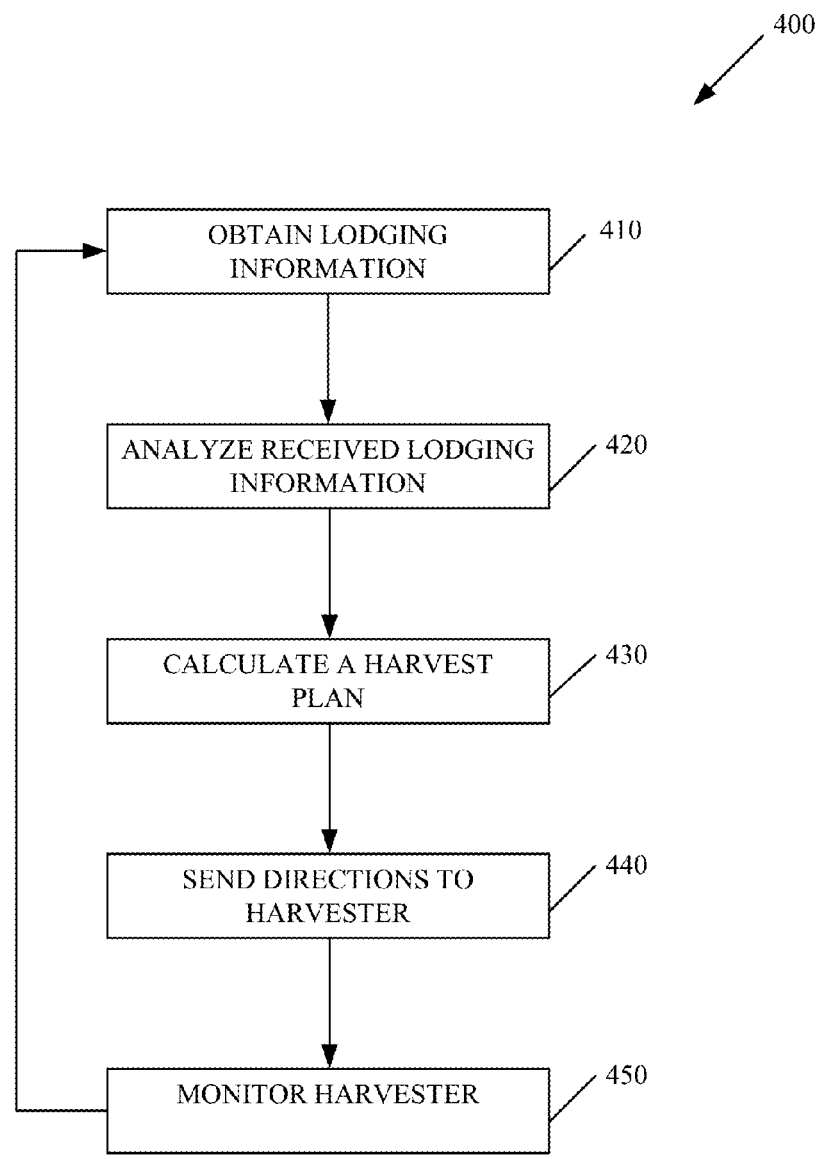
FIG. 4 is a flow diagram illustrating an example of directing a harvester in a field.

FIG. 4 is a flow diagram illustrating an example of the operation of architecture 300 in directing a harvester in a field. While operation 400 is described herein with respect to directing a single harvester, it may be utilized to generate directions for a plurality of harvesters in a field.

At block 410, lodging sensor system 320 collects lodging information for a given field 200. In one example, the lodging information may be obtained from an aerial sensor 302, for example, deployed on UAV 230. Device sensors 354 may also collect lodging information as harvesting machine 360 engages crop in field 200.

At block 420, analyzing component 340 analyzes received lodging information. Lodging analyzer 336 may generate one or more values indicative of characteristics of the lodged crop, for example a lodging direction 202, magnitude 206, break height 204, and/or estimated damage to field 200. All of the information may also be correlated to geographic position.

At block 430, route calculator 334, based on the lodging analysis, generates a harvest plan for one or more harvesters. Route calculator 334 may consider a variety of factors in generating the harvest plan. For example, it can still consider a predicted yield, based on an estimated maturation of crop 210. Route calculator 334 may also consider factors such as an estimated time per acre to harvest, an estimated profit per acre, estimated cost per acre to harvest, an estimated power or fuel consumption to harvest, etc. Additionally, a harvest plan may rely at least in part on a grouping analysis of the lodged crops based on the sensor information. Some grouping rules are described in more detail below.

At block 440, communications component 330 sends directions to harvesting machine(s) 360. These directions may be in the form of coordinates for defined field areas, and a harvest order for the field areas. The directions may also include a route map showing how to get to those areas and a harvesting direction 222 for each field area. It is to be understood that harvesting machine may not take a direct approach in harvesting a field, as not all of crop 210 in a field 200 may be harvested in a harvest operation. Instead, harvesting machine 360 may be directed to maneuver in the direction opposite to lodging direction 202, whatever that direction may be, regardless of an originally planted row direction. This may result in harvesting machine 360 traveling, for example, diagonally across field 200 (relative to the rows of crop) during a harvesting operation. Additionally, harvesting machine may be directed to not harvest some field areas, for example, because the damage is such that the green crop is no longer worth harvesting in those areas, or that the crop is relatively untouched and should be left to fully mature.

At block 450, analyzing component 340 monitors harvesting machine 360 as it harvests the designated field areas. Monitoring may comprise receiving signals from device sensors 356. The sensor signals may provide new information that either contradicts, or supplements, the information originally used by the route calculator 334. Operation 400 may, then, return back to block 410 with the new information. Additionally, monitoring may comprise at least partially automating the process of maneuvering harvesting machine 360 through field 200. This may comprise at least some automatic control of steering component 362, implement 354, etc.

Figure 5:
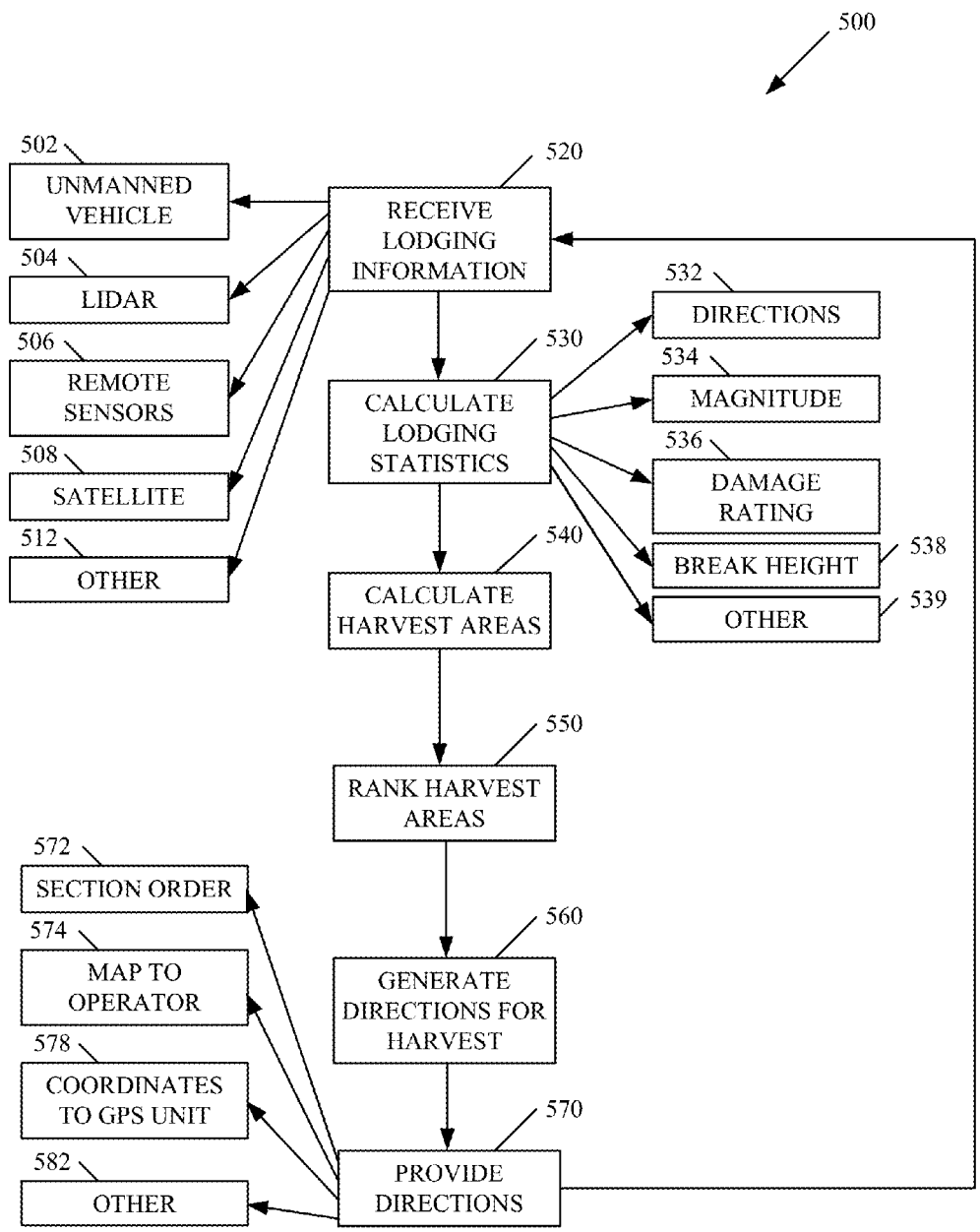
FIG. 5 is a flow diagram illustrating an example of generating a harvesting plan.

FIG. 5 is a flow diagram illustrating an example operation 500 for generating a harvesting plan. The harvest plan may comprise directions for a single harvesting machine 360, or multiple harvesting machines 360.

At block 520, analyzing component 340 receives lodging information. Lodging information may be received from sensors 302 of lodging sensor system 320. Additionally, lodging information may be received from device sensors 356, for example, during a harvesting operation. The lodging information may be received from any of a variety of sources including, but not limited to an unmanned aerial vehicle 502, a Lidar system 504 deployed on a vehicle, remote sensors 506, satellite 508, or other information source 512. It can also include updated information provided from device sensors 356.

At block 530, lodging analyzer 336 generates one or more values related to the received lodging information for field 200. The values may indicate (or relate to) the degree of damage to crop 210 in field 200, a lodging direction 532, a lodging magnitude 534, or a damage rating 536. Lodging analyzer 336 may also identify a break height 538 of the lodged crop, for example, by taking a known estimated height of the crop prior to damage, and subtracting a detected length of a fallen stalk. If the fallen length of the crop is, for example, one foot less than the predicted standing height of the crop, it can be estimated that the break height is around one foot. Break height 538 may be used in generating directions or in considering a height of harvesting implement 354. Analyzer 336 may identify other information 539 as well.

In one example, calculated or raw lodging information may be depicted on a lodging map, which may be presented to an operator of harvesting machine 360, such that different detected degrees of lodging, or other detected degrees of damage are indicated. The indication may be color-coded, highlighted, etc.

At block 540, route calculator 334 calculates a series of harvest areas for field 200. Harvest areas may be determined by applying one or more grouping rules to the lodging values for field 200 to determine harvestable field areas. One grouping rule, for example, compares the calculated lodging statistics to a known width of harvest implement 354, such that harvest areas are equal to, or less, than the width of the harvest head. Another grouping rule may determine a harvest area based on existing row orientation of planted crop. In one example, in which the crop is still green, damaged rows are harvested and undamaged rows are untouched. In another example, in which crop is mature, severely damaged rows are untouched while all other rows are harvested. Another grouping rule, for small grains, for example, may calculate harvest areas solely based on lodging direction 202. Another grouping rule may group areas of similar lodging magnitude and lodging direction 202. Another grouping rule may calculate harvest areas such that they do not overlap, for example, in order to prevent accidental collision between multiple harvesting machines 360 operating in field 200.

Route calculator 334 may also apply grouping rules with regard to other factors, such as for example harvester pass, harvested bushels/acres, hours to harvest per acre, expected revenue per acre or any other suitable factor. Some field areas may be classified, based on applied grouping rules, as non-harvest areas, or areas that should be classified as delayed, due to the time required to harvest, low expected yield, undamaged crop, or other reason. Grouping rules designating a field area as harvestable, unharvestable, or as a delayed harvest area, may be based on threshold values, such as a minimum harvest estimates of bushels per acre, maximum harvest hours per acre, minimum net revenue per hour, or other suitable values for deciding which field areas will be harvested. Additionally, a field area, in addition to including a defined space, may be defined by harvesting direction 222, for example.

At block 550, route calculator 334 ranks the field areas, for example, based on the grouping rules. Field areas may be ranked based on different criteria of interest, such as expected revenue, estimated time to harvest, estimated labor and machinery cost to harvest, estimated fuel or power consumption, estimated yield harvested per hour, or any other criteria important to a specific operator. Additionally, harvest areas may be ranked based on current and projected weather conditions. For example, although a particular field area may have a high anticipated yield, if it cannot be harvested before an incoming storm, it may be moved lower in ranking over other areas that may be harvestable according to time constraints. However, if the anticipated storm is delayed, or changes direction, the field area may be ranked higher. As new information is received by the analyzing component 340, route calculator 334 may re-rank field areas and update directions to the one or more harvesting machines 360 accordingly.

Some factors may be specific to crop type. For example, grain may be unharvestable if harvest is delayed. Harvest speeds may, then, be higher at a later time in the case of a crop that may experience some springing back motion after a lodging event. Additionally, for crops that will not be substantially damaged by remaining in a field while lodged over time, harvest speeds may be so slow and yields so adversely impacted, that a field or section of a field should be left to the end of the harvest season.

At block 560, route calculator 334 generates directions for the one or more harvesting machines 360. The directions may comprise, for each harvesting machine 360, a plurality of field areas to harvest. The directions may also comprise an order in which to harvest the field areas, and a harvesting direction 222 for each field area. In one example, directions for the one or more harvesting machines 360 may take into account route efficiency for the harvesting machine(s) 360. For example, they may split the field areas across harvesting machines 360 such that individual harvesting machines 360 have the most direct route, minimizing time for a specific harvesting machine 360 to move between field areas to be harvested, or minimizing maneuvering to achieve the correct harvesting direction 222.

At block 570, communications component 330 provides the generated directions to the one or more harvesting machines 360, or to their respective operators. In one example, directions may be communicated using communications component 350, which may then display them on a surface of the harvesting machine 360. The communications component 350 may also deliver the received directions to a propulsion and direction controller on the harvesting machine 360. Additionally, communications component 330 may provide the generated directions to a device specific to an operator. In one embodiment, the directions are received by an operator on a mobile device, for example, as a text message or e-mail, or as a notification through an application accessed by an operator on a mobile device separate from the harvesting machine 360.

The provided directions may comprise any of a section order 572 indicating ranked harvest areas, a map 574 provided to an operator, a series of coordinates provided directly to a GPS receiver and control unit 578, or they can be any other directional information 582. In one example, all or a subset of these are provided simultaneously, or selectably by an operator based on operator preference. For example, a map 574 may be provided on a user interface display in the harvesting machine 360, along with a list of areas 572 to harvest and an order for those areas. In one example, the harvest areas may appear highlighted on a displayed map 574, showing a harvesting direction.

As shown in FIG. 5, operation 500 may repeat as analyzing component 340 receives sensor signals. For example, as harvesters are in the field, they may receive information through device sensors 356 that necessitate an update of the generated harvest plan. In another example, new information may be received about weather conditions, for example a storm coming in faster than expected, or not at all. This may cause the ranking of the harvest areas to change, resulting in a need to update directions and a current harvest plan. Additionally, new information may be received indicating lodged crop has sprung back, or lodged further.

Providing directions to harvesting machine 360, for example in block 570, may also consider an auger direction of the harvesting machine 360 and an ability to transfer harvested material from the harvesting machine 360 to a material transport vehicle. The material transport vehicle may be, for example, a self-propelled truck or a truck-drawn wagon. The grouping rules may also consider an estimated amount of crop to be harvested in a given pass, for example, to direct the movement of the material transport vehicle(s) in conjunction with the harvesting machines 360. Additionally, the grouping rules may consider an estimated amount of crop to be harvested in a given pass in applying a constraint that harvesting machine 360 must harvest next to a previously harvested pass such that harvested crop may be transferred.

In one example, providing directions 570 may also comprise detecting, with a processor 352, whether a harvesting machine 360 is on track with the harvest plan. Processor 352 may detect whether harvesting machine 360 is following harvesting direction 222 and/or whether it is harvesting on time, based on the projections utilized by route calculator 334. The monitoring information may be used to update the harvest plan, for example, if a field area is taking longer, or short, than an expected harvest time.

In one example, providing directions 570 may also comprise material process settings for a material processing subsystem 355. Providing directions 570 may also comprise providing adjustments to the material processing settings.

Providing directions, in block 570, may also comprise at least some automated control of harvesting machine 360. One example of some automated control of the harvesting may comprise, for example, adjusting power system 352, changing a power output, or allocating power between subsystems of harvesting machine 360 along the harvest route. Power allocation may be changed, for example, based on the position of harvesting machine 360 along a route and based on anticipated lodging magnitude and/or direction 202. It may also comprise controlling steering component 362. It may also comprise controlling a propulsion system 355 based on lodging magnitude or direction 202, such that harvesting machine 360 engages the lodged crop 210 at a suitable speed. It may also comprise controlling the material processing subsystem 355.

Automated control of harvesting machine 360 may also comprise generating one or more settings for harvest implement 354, for example a harvest head height and orientation. It can include adjusting implement settings, based on, for example, a current position in the field and known information about the lodge crop directly ahead of the current position.

Automatic direction may also comprise generating settings for material processing by harvesting machine 360, and directing harvesting machine 360 to adjust material processing based on its position in the field, expected and actual harvest yields, or other information.

Figure 6:
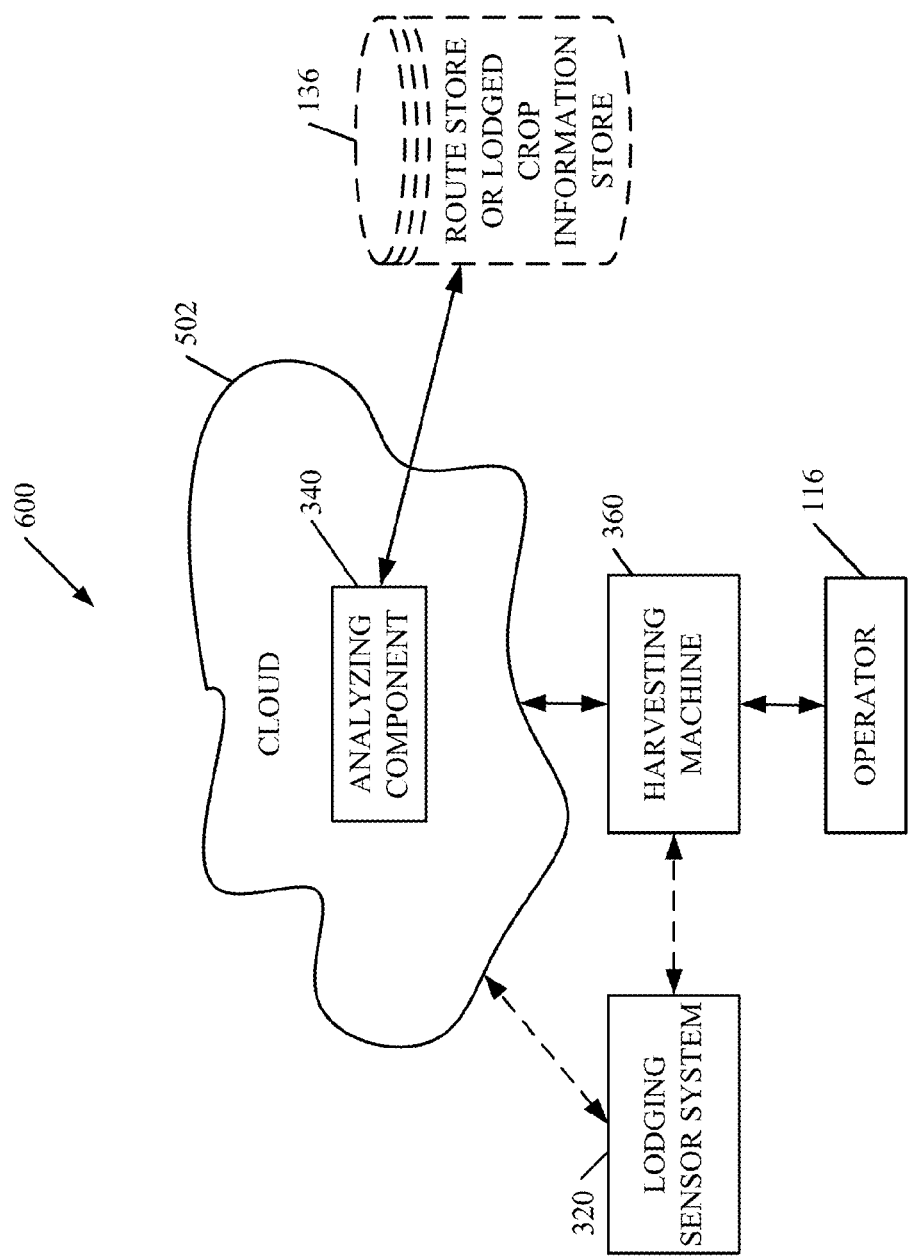
FIG. 6 is a block diagram of one example of a remote server environment.

FIG. 6 also depicts another example of a remote server architecture. FIG. 6 shows that it is also contemplated that some elements of FIG. 3 are disposed at remote server location 502 while others are not. By way of example, route store 136 or analyzing component 340 can be disposed at a location separate from location 502, and accessed through the remote server at location 502. Regardless of where they are located, they can be accessed directly by harvesting machine 360, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 3, or portions of them, can be disposed on a wide variety of different devices. Some of those devices include servers, various different kinds of computers, tablet computers, or other mobile devices, such as palm top computers, cell phones, smart phones, multimedia players, personal digital assistants, etc. It will also be noted that the elements of FIG. 3, specifically the lodging sensor system 320, analyzing component 340, and harvesting machine 360, can communicate with one another in a variety of ways. For example, Lodging sensor system 320 can communicate directly with harvesting machine, or through the remote location 502.

Figure 7:
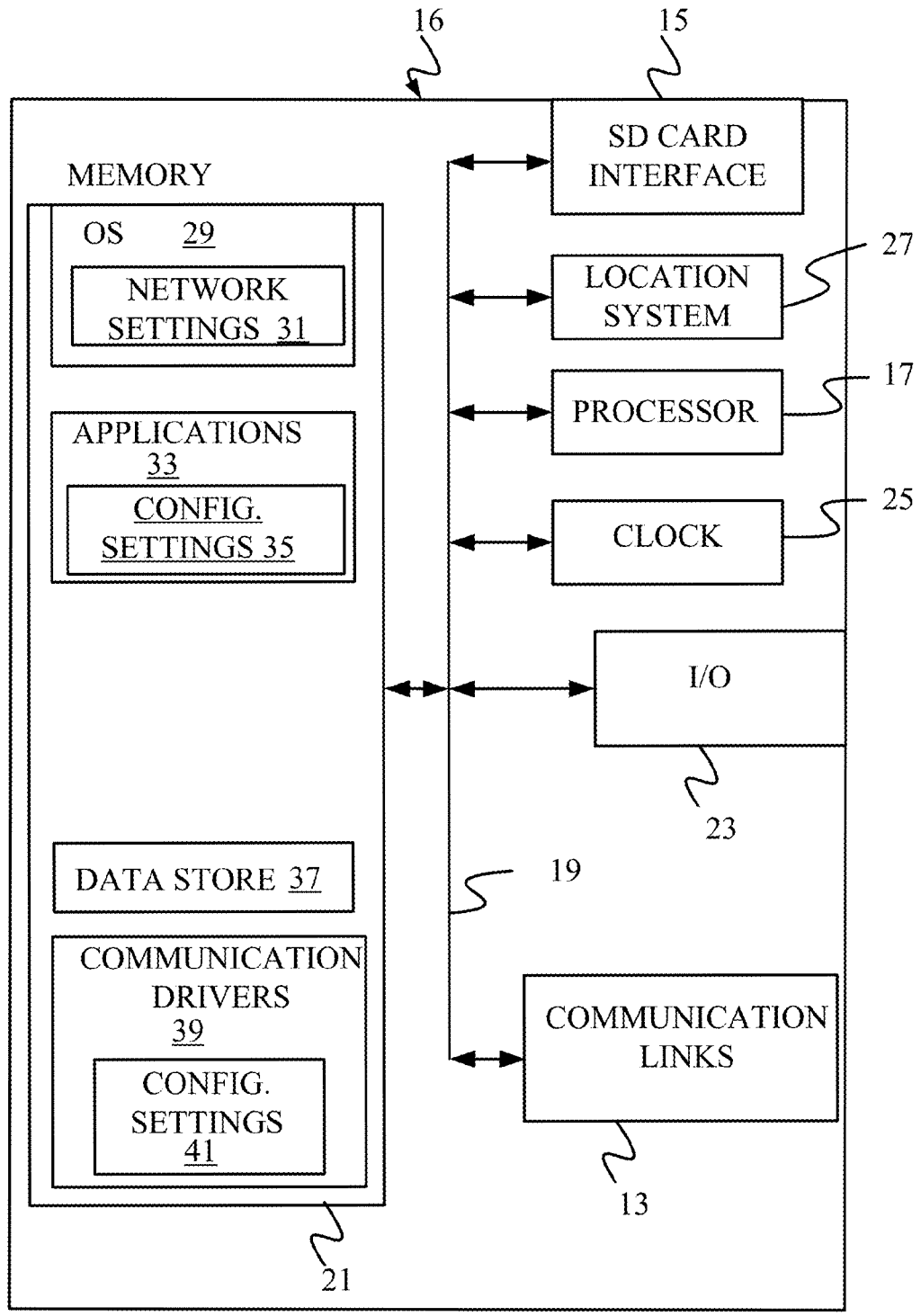
FIGS. 7-9 show examples of mobile devices that can be used in the architectures shown in the previous figures.
Figure 8:
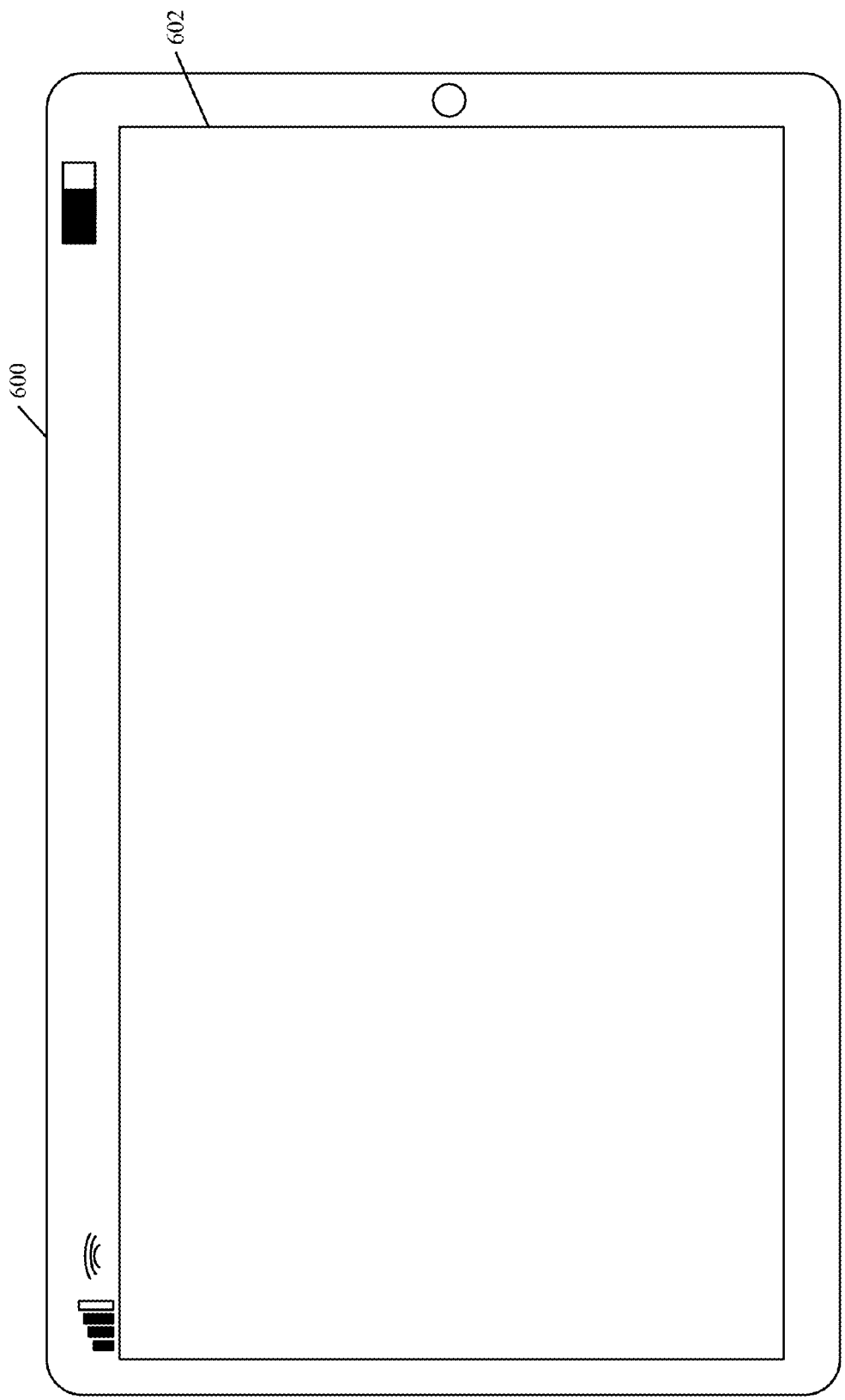
Figure 9:
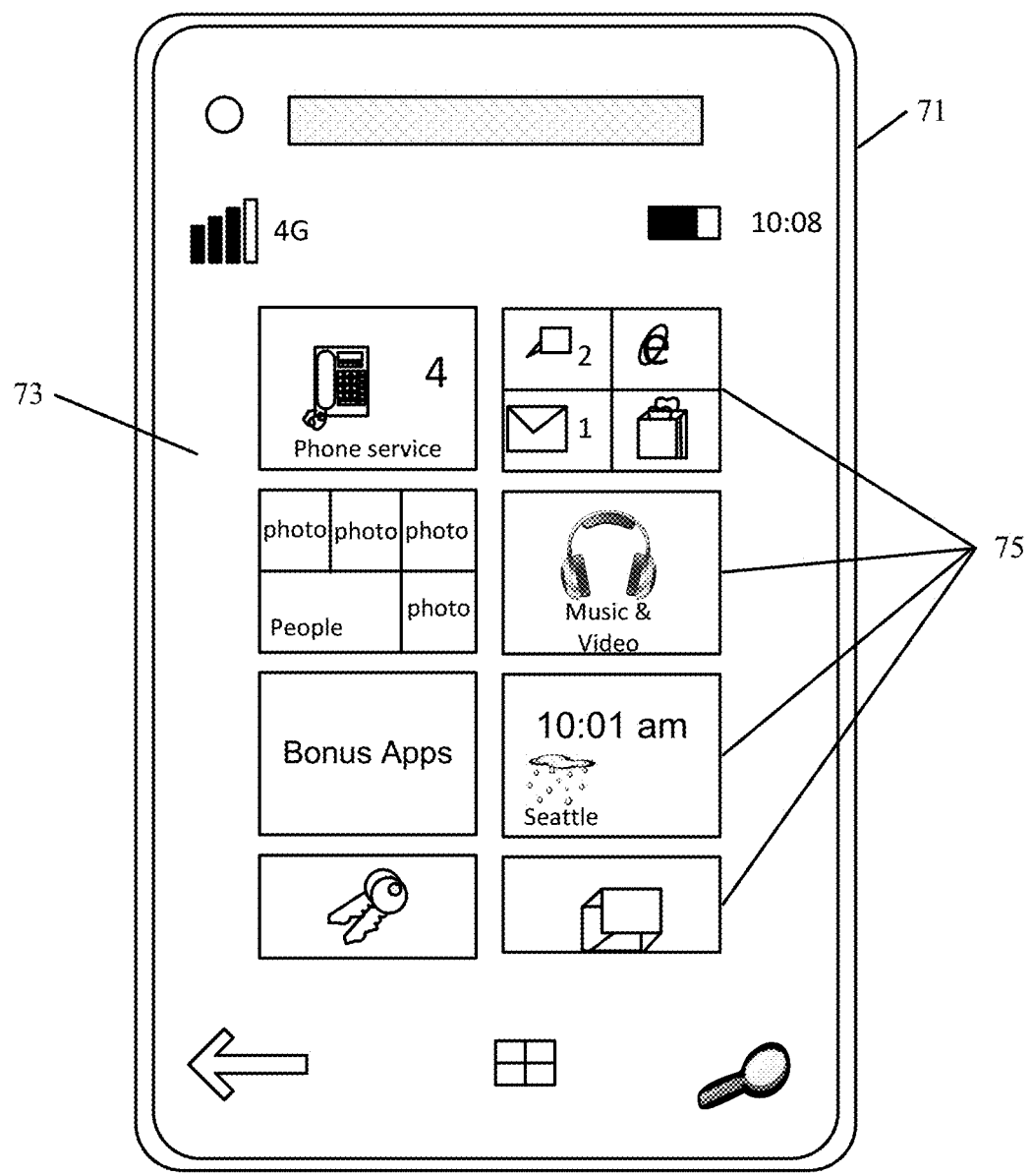
Figure 10:
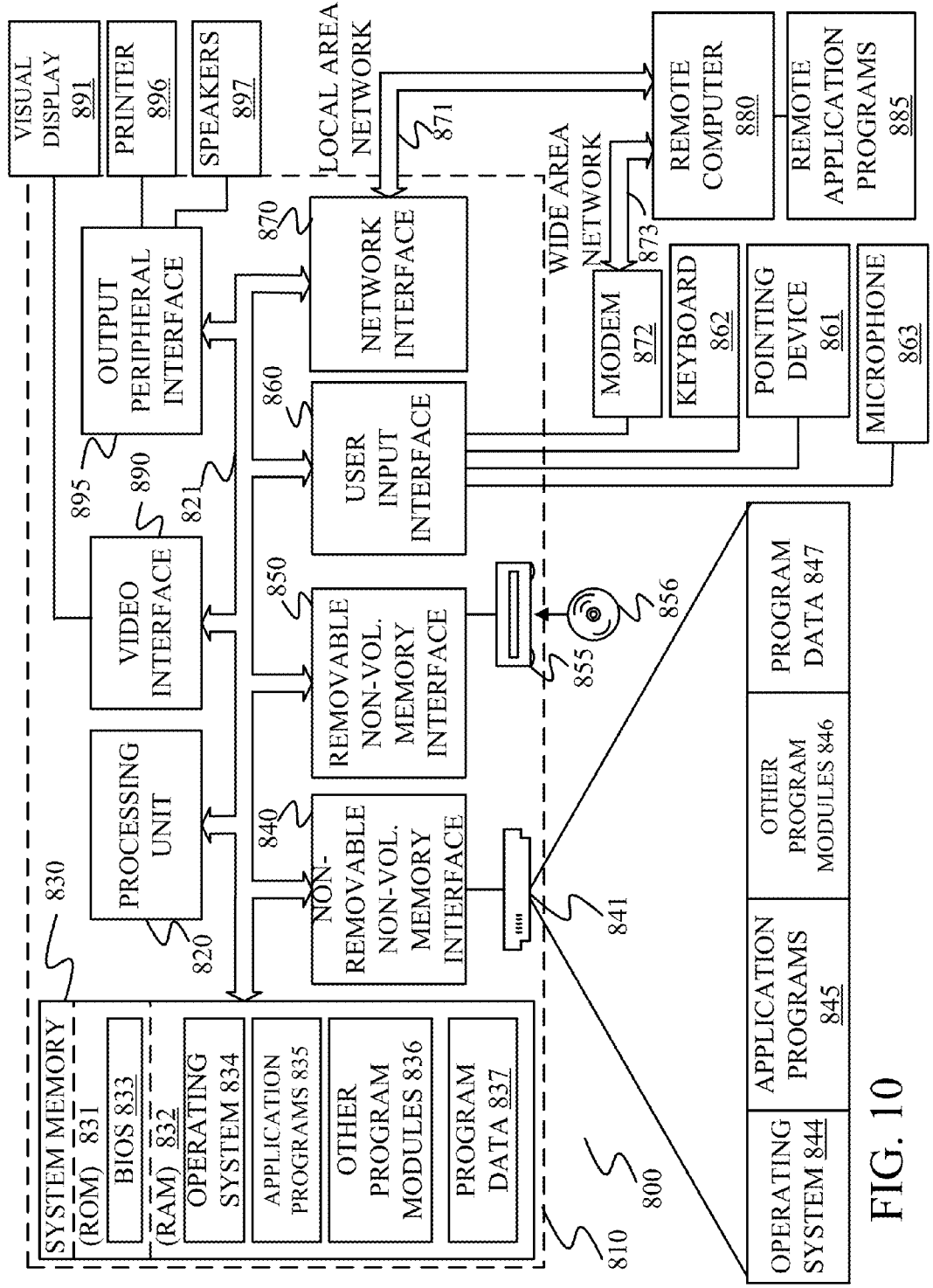
FIG. 10 is a block diagram of one example of a computing environment that can be deployed in any of the architectures shown in previous figures.

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of harvesting machine 360 for use in generating, processing, or displaying any of the information provided by lodging sensor system 320, analyzing component 340 and/or harvesting machine 360. FIGS. 8-10 are examples of handheld or mobile devices.

FIG. 7 provides a general block diagram of the components of a client device 16 that can run some components shown in FIG. 3, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor 114 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that device 16 can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 10 is one example of a computing environment in which elements of FIG. 3, or parts of it, (for example) can be deployed. With reference to FIG. 10, an example system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, a cab area network—CAN, or wide area network—WAN) to one or more remote computers, such as a remote computer 880.

When used in a LAN networking environment, the computer 810 is connected to the LAN 871 through a network interface or adapter 870. When used in a CAN environment, computer 810 is connected through a suitable interface and wired or wireless connection. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a harvest route generator system that generates a harvest route for a harvesting machine, the harvest route generator comprising:

a route generator that receives lodged crop information, from a sensor system, indicative of a characteristic of a lodged crop in a field and generates a harvesting route through the field for the harvesting machine, based on the lodged crop information; and a communication component that communicates the harvesting route through the field to the harvesting machine.

Example 2 is the harvest route generator system of any or all previous examples and further comprising:

a grouping component that accesses a set of grouping rules and groups areas of the field together based on the lodged crop information and the grouping rules, and provides an indication of the grouped areas of the field to the route generator.

Example 3 is the harvest route generator system of any or all previous examples wherein the lodged crop information comprises a lodging magnitude and a lodging orientation in the field, and wherein the grouping component is configured to group the areas of the field into the grouped areas based on a similarity of lodging information for the grouped areas.

Example 3 is the harvest route generator system of any or all previous examples wherein the route generator is configured to generate the harvesting route through the field based on the grouped areas and the lodging information corresponding to the grouped areas.

Example 4 is the harvest route generator system of any or all previous examples wherein the grouping component is configured to correlate the grouped areas to geographic position in the field and generate a field lodging map with the grouped areas correlated to lodging magnitude and orientation and correlated to geographic position in the field.

Example 5 is the harvest route generator system of any or all previous examples wherein the grouping component identifies a set of excluded areas that are excluded from the harvesting route based on the lodging information for the excluded areas and based on the grouping rules.

Example 6 is the harvest route generator of any or all previous examples and further comprising:

a lodging sensor that senses the lodging magnitude and lodging orientation.

Example 7 is the harvest route generator system of any or all previous examples wherein the lodging sensor comprises:

an image sensor that senses an image of the crop and generates the lodging magnitude and lodging orientation based on the sensed image.

Example 8 is the harvest route generator system of any or all previous examples wherein the lodging sensor comprises at least one of:

a field texture sensor that senses a texture of the field or a field surface sensor that senses characteristics of a surface of the crop on the field.

Example 9 is the harvest route generator system of any or all previous examples and further comprising at least one of:

an aerial vehicle that carries the lodging sensor or a terrestrial vehicle that carries the lodging sensor.

Example 10 is the harvest route generator system of any or all previous examples wherein the lodging sensor further comprises:

a snap height sensor that senses a snap height of the lodged crop.

Example 11 is a harvesting machine, comprising:

a propulsion and steering subsystem that propels and steers the harvesting machine through a field;

a set of harvesting subsystems that perform harvesting and material handling operations to harvest a crop from the field; and a controller that receives lodging information indicative of lodging characteristics of a lodged crop in the field and that generates a subsystem control signal based on the lodging information to control at least one of the subsystems.

Example 12 is the harvesting machine of any or all previous examples and further comprising:

a position sensor that senses a position of the harvesting machine in the field and generates a position signal indicative of the position of the harvester in the field, wherein the controller receives the lodging information as lodging orientation and lodging magnitude, correlated to geographic position in the field, and generates the subsystem control signal based on the lodging information and the position of the harvesting machine in the field.

Example 13 is the harvesting machine of any or all previous examples wherein the controller generates the subsystem control signal to adjust power to the subsystems based on the lodging information, as the harvesting machine moves through the field.

Example 14 is the harvesting machine of any or all previous examples wherein the controller further comprises:

a route controller that generates a route through the field based on the lodging information.

Example 15 is the harvesting machine of any or all previous examples wherein the controller is configured to generate the subsystem control signal to control the propulsion and steering subsystem to guide the harvesting machine through the field based on the route.

Example 16 is the harvesting machine of any or all previous examples wherein the controller is configured to generate the subsystem control signal to surface the route on a user interface for an operator of the harvesting machine.

Example 17 is the harvesting machine of any or all previous examples wherein one of the set of subsystems includes a crop harvesting head and wherein the controller is configured to generate the subsystem control signal to control operation of the crop harvesting head as the harvesting machine moves through the field, based on the lodging information.

Example 18 is the harvesting machine of any or all previous examples and further comprising:

a harvesting machine sensor that senses a characteristic of the field or crop as the harvesting machine is moving through the field, wherein the route controller is configured to adjust the route through the field based on the sensed characteristic.

Example 19 is a computer implemented method of generating a harvest route for a harvesting machine, the method comprising:

receiving lodged crop information, indicative of lodging magnitude and a lodging orientation of a lodged crop in a field;

generating a harvesting route through the field for the harvesting machine, based on the lodged crop information; and communicating the harvesting route through the field to the harvesting machine.

Example 20 is the computer implemented method of any or all previous examples and further comprising:

accessing a set of grouping rules and grouping areas of the field together based on a similarity in the lodged crop information and based on the grouping rules;

correlating the grouped areas to geographic position in the field; generating a field lodging map with the grouped areas correlated to lodging magnitude and orientation and correlated to geographic position in the field; and providing the field lodging map to the route generator, wherein generating the harvesting route comprises generating the harvesting route through the field based on the field lodging map.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A harvest route generator system that generates a harvest route for a harvesting machine, the harvest route generator comprising:
    a route generator that receives lodged crop information, from a sensor system, indicative of a characteristic of a lodged crop in a field and generates;
    a communication component that communicates the harvesting route through the field to the harvesting machine; and
    a grouping component that accesses a set of grouping rules and groups areas of the field together based on the lodged crop information and the grouping rules, and provides an indication of the grouped areas of the field to the route generator the route generator generating a harvesting route through the field for the harvesting machine, based on the lodged crop information and the grouped areas.

2. The harvest route generator system of claim 1 wherein the lodged crop information comprises a lodging magnitude and a lodging orientation in the field, and wherein the grouping component is configured to group the areas of the field into the grouped areas based on a similarity of lodging information for the grouped areas.

3. The harvest route generator system of claim 2 wherein the route generator is configured to generate the harvesting route through the field based on the grouped areas and the lodging information corresponding to the grouped areas.

4. The harvest route generator system of claim 2 wherein the grouping component is configured to correlate the grouped areas to geographic position in the field and generate a field lodging map with the grouped areas correlated to lodging magnitude and orientation and correlated to geographic position in the field.

5. The harvest route generator system of claim 4 wherein the grouping component identifies a set of excluded areas that are excluded from the harvesting route based on the lodging information for the excluded areas and based on the grouping rules.

6. The harvest route generator of claim 2 and further comprising:
    a lodging sensor that senses the lodging magnitude and lodging orientation.

7. The harvest route generator system of claim 6 wherein the lodging sensor comprises:
    an image sensor that senses an image of the crop and generates the lodging magnitude and lodging orientation based on the sensed image.

8. The harvest route generator system of claim 6 wherein the lodging sensor comprises at least one of:
    a field texture sensor that senses a texture of the field or
    a field surface sensor that senses characteristics of a surface of the crop on the field.

9. The harvest route generator system of claim 6 and further comprising at least one of:
    an aerial vehicle that carries the lodging sensor or a terrestrial vehicle that carries the lodging sensor.

10. The harvest route generator system of claim 2 wherein the lodging sensor further comprises:
    a snap height sensor that senses a snap height of the lodged crop.

11. A harvesting machine, comprising:
    a propulsion and steering subsystem that propels and steers the harvesting machine through a field;
    a set of harvesting subsystems that perform harvesting and material handling operations to harvest a crop from the field; and
    a controller that receives lodging information indicative of lodging characteristics of a lodged crop in the field and that generates a subsystem control signal based on the lodging information to control at least one of the subsystems; and
    a position sensor that senses a position of the harvesting machine in the field and generates a position signal indicative of the position of the harvester in the field, wherein the controller receives the lodging information as lodging orientation and lodging magnitude, correlated to geographic position in the field, and generates the subsystem control signal based on the lodging information and the position of the harvesting machine in the field.

12. The harvesting machine of claim 11 wherein the controller generates the subsystem control signal to adjust power to the subsystems based on the lodging information, as the harvesting machine moves through the field.

13. The harvesting machine of claim 11 wherein the controller further comprises:
a route controller that generates a route through the field based on the lodging information.

14. The harvesting machine of claim 13 wherein the controller is configured to generate the subsystem control signal to control the propulsion and steering subsystem to guide the harvesting machine through the field based on the route.

15. The harvesting machine of claim 13 wherein the controller is configured to generate the subsystem control signal to surface the route on a user interface for an operator of the harvesting machine.

16. The harvesting machine of claim 11 wherein one of the set of subsystems includes a crop harvesting head and wherein the controller is configured to generate the subsystem control signal to control operation of the crop harvesting head as the harvesting machine moves through the field, based on the lodging information.

17. The harvesting machine of claim 13 and further comprising:
a harvesting machine sensor that senses a characteristic of the field or crop as the harvesting machine is moving through the field, wherein the route controller is configured to adjust the route through the field based on the sensed characteristic.

18. A computer implemented method of generating a harvest route for a harvesting machine, the method comprising:
receiving lodged crop information, indicative of lodging magnitude and a lodging orientation of a lodged crop in a field;
generating a harvesting route through the field for the harvesting machine, based on the lodged crop information;
communicating the harvesting route through the field to the harvesting machine;
accessing a set of grouping rules and grouping areas of the field together based on a similarity in the lodged crop information and based on the grouping rules;
correlating the grouped areas to geographic position in the field;
generating a field lodging map with the grouped areas correlated to lodging magnitude and orientation and correlated to geographic position in the field; and
providing the field lodging map to the route generator, wherein generating the harvesting route comprises generating the harvesting route through the field based on the field lodging map.

* * * * *